(12) United States Patent
Venkatesh et al.

(10) Patent No.: US 9,112,744 B1
(45) Date of Patent: Aug. 18, 2015

(54) NOISE WHITENING IN A WLAN RECEIVER (71) Applicant: MARVELL INTERNATIONAL LTD., Hamilton (BM)

(72) Inventors: Swaroop Venkatesh, Dublin, CA (US); Manikandan Chandrasekar, Nadu (IN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/026,856

(22) Filed: Sep. 13, 2013

Related U.S. Application Data (60) Provisional application No. 61/720,513, filed on Oct. 31, 2012.

(51) Int. Cl.
*H04L 25/03* (2006.01)
*H04L 25/02* (2006.01)

(52) U.S. Cl.
CPC ...... *H04L 25/03993* (2013.01); *H04L 25/0258* (2013.01)

(58) Field of Classification Search
CPC ..... H04L 25/38; H04L 1/006; H04L 25/0202; H04L 25/0242; H04L 25/025; H04L 25/0256; H04L 25/0258; H04L 25/03891; H04L 25/0391; H04L 25/03993; H04L 2201/04; H04L 2201/06; H04B 3/54
USPC ......... 375/360, 231, 261, 259, 265, 267, 341, 375/347, 295, 232, 262, 340, 346, 350; 370/208, 210, 338
See application file for complete search history.

(56) References Cited

U.S. PATENT DOCUMENTS

| 8,548,028 | B2 | 10/2013 | Yellin | |
|---|---|---|---|---|
| 2010/0158162 | A1* | 6/2010 | Fujii | 375/341 |
| 2010/0248666 | A1* | 9/2010 | Hui et al. | 455/208 |

OTHER PUBLICATIONS

IEEE Std 802.11[198] 2012 (Revision of IEEE STD 802.Nov. 2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Young T Tse (57) ABSTRACT

In a method of whitening noise in a signal received by a receiving device from a transmitting device via a multi input multi output (MIMO) communication channel, a data unit is received at the receiving device via the MIMO communication channel. A channel estimate H corresponding to the MIMO communication channel is determined based on the training signals. A noise scaling factor s is determined. The noise scaling factor s is a ratio of variance of noise at the receiving device to a variance of noise at the transmitting device. A noise whitening matrix W is determined using the channel estimate H and the noise scaling factor s. The noise whitening matrix W is applied to (i) the channel estimate H to generate an effective channel matrix $H_{eff}$ and (ii) to the data symbols to generate whitened data symbols.

22 Claims, 8 Drawing Sheets

(56) References Cited

OTHER PUBLICATIONS

IEEE Std 802.11ac/D2.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-385 (Jun. 2012).

IEEE Std 802.11ac/D4.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-408 (Oct. 2012).

IEEE Std 802.11ac/D5.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-440 (Jan. 2013).

IEEE Std 802.11ac/D6.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std. 802.11n™"IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).

IEEE P802.11n™/D3.00, "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

Perahia, et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

\* cited by examiner

NOISE WHITENING IN A WLAN RECEIVER

CROSS-REFERENCES TO RELATED APPLICATIONS

This disclosure claims the benefit of U.S. Provisional Patent Application No. 61/720,513, entitled "Noise-Whitening for MIMO 802.11n and 802.11ac," filed on Oct. 31, 2012, which is herein incorporated by reference in its entirety.

FIELD OF THE DISCLOSURE

The present disclosure relates generally to communication networks and, more particularly, to noise whitening in multi input multi output (MIMO) communication systems.

BACKGROUND

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range.

SUMMARY

In an embodiment, a method of whitening noise in a signal received by a receiving device from a transmitting device via a multi input multi output (MIMO) communication channel includes receiving, at the receiving device, a data unit via the MIMO communication channel, wherein the data unit includes at least training symbols and data symbols. The method further includes determining, with the receiving device and based on the training symbols, a channel estimate H corresponding to the MIMO communication channel. The method further includes determining a noise scaling factor s, wherein the noise scaling factor s is a ratio of variance of noise at the receiving device to a variance of noise at the transmitting device, and determining, using the channel estimate H and the noise scaling factor s, a noise whitening matrix W. The method additionally includes applying the noise whitening matrix W to (i) the channel estimate H to generate an effective channel matrix $H_{eff}$ and (ii) to the data symbols to generate whitened data symbols.

In another embodiment, and apparatus comprises a network interface configured to receive a data unit via the MIMO communication channel, wherein the data unit includes at least training symbols and data symbols. The network interface includes a channel estimation unit configured to determine, based on the training symbols, a channel estimate H corresponding to the MIMO communication channel. The network interface also includes a noise scaling factor generator configured to determine a noise scaling factor s, wherein the noise scaling factor s is a ratio of variance of receiver noise to a variance of transmitter noise, and a noise whitening unit configured to determine, using the channel estimate H and the noise scaling factor s, a noise whitening matrix W. The network interface is further configured to apply the noise whitening matrix W to (i) the channel estimate H to generate an effective channel matrix $H_{eff}$ and (ii) the data symbols to generate whitened data symbols.

DETAILED DESCRIPTION

In embodiments described below, wireless network devices such as an access point (AP) and client devices of a wireless local area network (WLAN) transmit data streams between the AP and the client devices. In some embodiments, the WLAN supports multiple input multiple output (MIMO) communication in which the AP and/or the client stations include more than one antenna, thereby creating a plurality of spatial (or space-time) streams over which data can be transmitted simultaneously. In at least some embodiments, to improve reception at a receiving device (e.g., the AP, a client station), the receiving device performs channel equalization to remove effects of the channel from a signal prior to demodulating the signal. For example, one MIMO equalization approach, according to an embodiment, uses maximum likelihood (ML) equalization techniques. Generally, ML equalization is considered optimal to the extent that ML equalization attempts to minimize the probability of an error over a sequence of received bits or symbols. While optimal in some situations, ML techniques are complex and expensive to implement, in some embodiments. In some embodiments, a zero forcing (ZF) equalizer is utilized. Generally speaking, a ZF equalizer attempts to restore a received signal by applying an inverse of the channel to the signal. In at least some situations, ML techniques, even limited by system constraints, can exhibit significant performance advantages over ZF techniques, particularly for flat fading channels, in some embodiments.

In theory, under ideal conditions (i.e., no radio frequency (RF) or other system impairments), and where processing power is unlimited, it is expected that exhaustive search ML strategies will always provide superior results as compared to ZF strategies, particularly with respect to MIMO systems. However, in practical applications, RF impairments such as phase noise, flicker noise, power amplifier non-linearities, in-phase/quadrature-phase (I/Q) mismatches, carrier frequency offsets, etc. either individually or in combination, affect performance of both ML and ZF techniques. For example, "dirty transmissions" as measured by transmitter error vector magnitude (Tx-EVM), i.e., a measure of deviation of constellation points in a transmitted signal from ideal, or theoretical, constellation point locations, negatively affect performance of ML techniques due, at least in part, to "coloring" of the noise by the communication channel. In other words, in such situations, noise in the signal becomes correlated with respect to the multiple spatial streams, resulting in a degraded performance of the equalizer, in an embodiment. In some embodiments, to improve performance of the equalizer, the receiver applies noise whitening to received signals prior to equalization and decoding of the received signals. Improvements in performance of the equalizer generally leads to increased sensitivity of the receiver, allowing, for example, for increased range of transmissions, increased data throughput, etc., in at least some embodiments.

Figure 1:
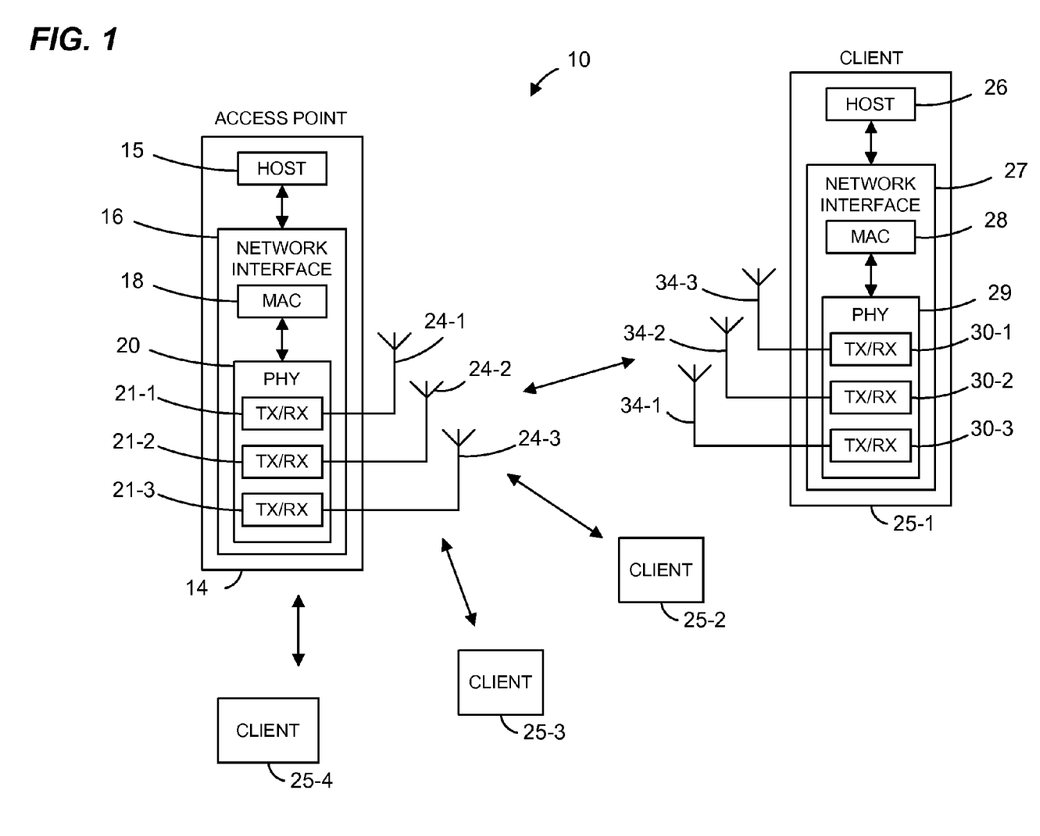
FIG. 1 is a block diagram of an example wireless local area network (WLAN) in which one or more communication devices utilize noise whitening techniques of the present disclosure, according to an embodiment.

FIG. 1 is a block diagram of an example wireless local area network (WLAN) 10 in which one or more communication devices utilize noise whitening techniques of the present disclosure, according to an embodiment. An AP 14 includes a host processor 15 coupled to a network interface 16. The network interface 16 includes a medium access control (MAC) unit 18 and a physical layer (PHY) unit 20. The PHY unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or more of the client stations 25-2 and 25-3, 25-4 has a structure the same as or similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In some embodiments, the WLAN 10 supports operation according to one or more IEEE 802.11 Standards, such as the 802.11n Standard and/or 802.11ac Standard. In such embodiments, the AP 14 and the client stations 25 are configured to transmit and receive data unit conforming to the one or more IEEE 802.11 Standards. In such embodiments, the AP 14 and/or the client stations 25 are configured to perform channel estimation and noise whitening based on received data units that conform to the one or more of the IEEE 802.11 Standards. In other embodiments, channel estimation and noise whitening techniques described herein are performed based on signal conforming to other suitable communication protocols.

Figure 2:
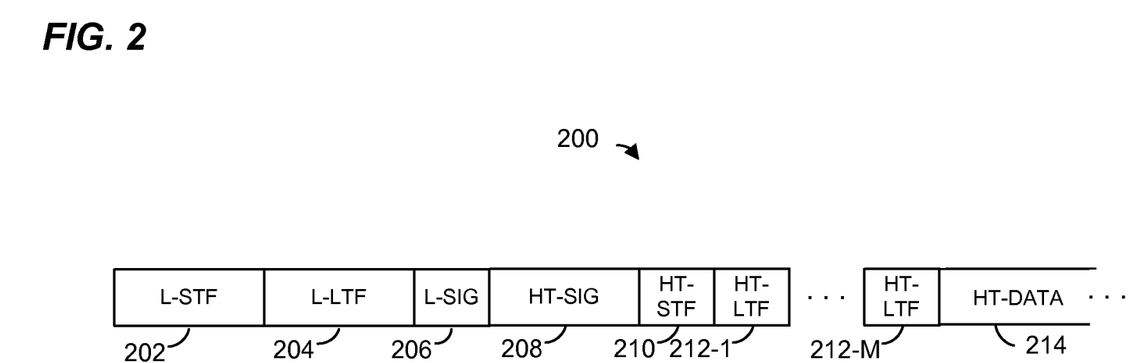
FIG. 2 is a diagram of an OFDM data unit, according to an embodiment.

FIG. 2 is a diagram of an OFDM data unit 200 that the AP 14 is configured to transmit to a client station 25 (e.g., the client station 25-1) via orthogonal frequency domain multiplexing (OFDM) modulation, according to an embodiment. In an embodiment, the client station 25-1 is also configured to transmit the data unit 200 to the AP 14. The data unit 200 conforms to the IEEE-802.11n Standard and is designed for mixed mode situations, i.e., when the WLAN 10 includes one or more legacy client stations (e.g., conforming to the IEEE 802.11a Standard but not to the IEEE 802.11n Standard). The data unit 200 includes a preamble legacy portion having a legacy short training field (L-STF) 202, a legacy long training field (L-LTF) 204, and a legacy signal field (L-SIG) 206. The preamble of the data unit 200 also includes a non-legacy, or a high throughput, portion having a high throughput signal field HT-SIG 208 which includes various information related to PHY transmission of the data unit 200, such as a modulation and coding scheme (MCS) used for the data unit 200, a bandwidth of the data unit 200, etc. The preamble of the data unit 200 further includes a high throughput short training field (HT-STF) 210, and M high throughput data long training fields (HT-LTFs) 212, where M is an integer which generally corresponds to a number of spatial streams used to transmit the data unit 200 via a MIMO communication channel. Each of the HT-LTF fields 212 includes training symbols to train a receiver on a respective dimension (spatial stream) of the data unit 200. In an embodiment, L-STF 202, L-LTF 204, L-SIG 206 and HT-SIG 208 is each transmitted over a single spatial (or space-time) stream and is generated according to a lowest modulation and coding scheme (i.e., using binary phase shift keying (BPSK) and a coding rate of ½). The data unit 200 also includes a data portion 214.

Figure 3:
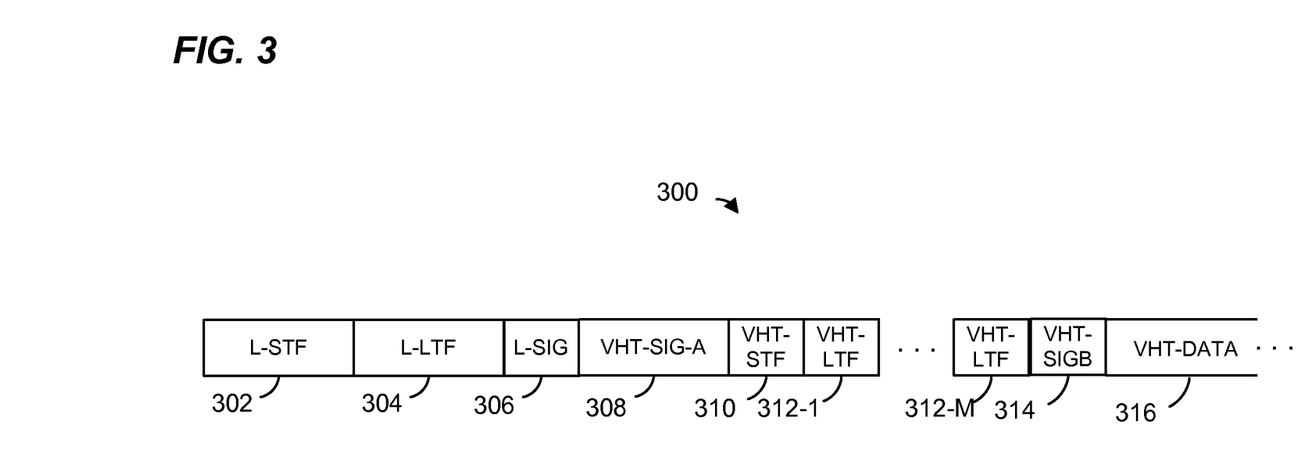
FIG. 3 is a diagram of an OFDM data unit, according to another embodiment.

FIG. 3 is a diagram of an OFDM data unit 300 that the AP 14 is configured to transmit to a client station 25 (e.g., the client station 25-1) via orthogonal frequency domain multiplexing (OFDM) modulation, according to an embodiment. In an embodiment, the client station 25-1 is also configured to transmit the data unit 300 to the AP 14. The data unit 300 conforms to the IEEE-802.11ac Standard and is designed for mixed mode situations, i.e., when the WLAN 10 includes one or more legacy client stations (e.g., conforming to the IEEE 802.11a Standard but not to the IEEE 802.11ac Standard). The data unit 300 includes a preamble legacy portion having a legacy short training field (L-STF) 302, a legacy long training field (L-LTF) 304, and a legacy signal field (L-SIG) 306. The data unit 300 also includes a non-legacy, or a very high throughput, preamble portion having a first very high throughput signal field VHT-SIGA 308 which includes various information related to PHY transmission of the data unit 300, such as a modulation and coding scheme (MCS) used for the data unit 300, a bandwidth of the data unit 300, etc. The VHT preamble portion further includes a very high throughput short training field (VHT-STF) 310, and M very high throughput data long training fields (VHT-LTFs) 312, where M is an integer which generally corresponds to a number of spatial streams used to transmit the data unit 300 via a MIMO communication channel. Each of the VHT-LTF fields 312 includes training symbols to train a receiver on a respective dimension (spatial stream) of the data unit 300. The VHT-LTFs 312 are followed by a second VHT signal field (VHT-SIGB) 314. In an embodiment, L-STF 302, L-LTF 304, L-SIG 306, VHT-SIGA 308, and, in some embodiments, VHT-SIGB 314 is each transmitted over a single spatial (or space-time) stream and is generated according to a lowest modulation and coding scheme (i.e., using binary phase shift keying (BPSK) and a coding rate of ½). The data unit 300 also includes a data portion 316.

Figure 4:
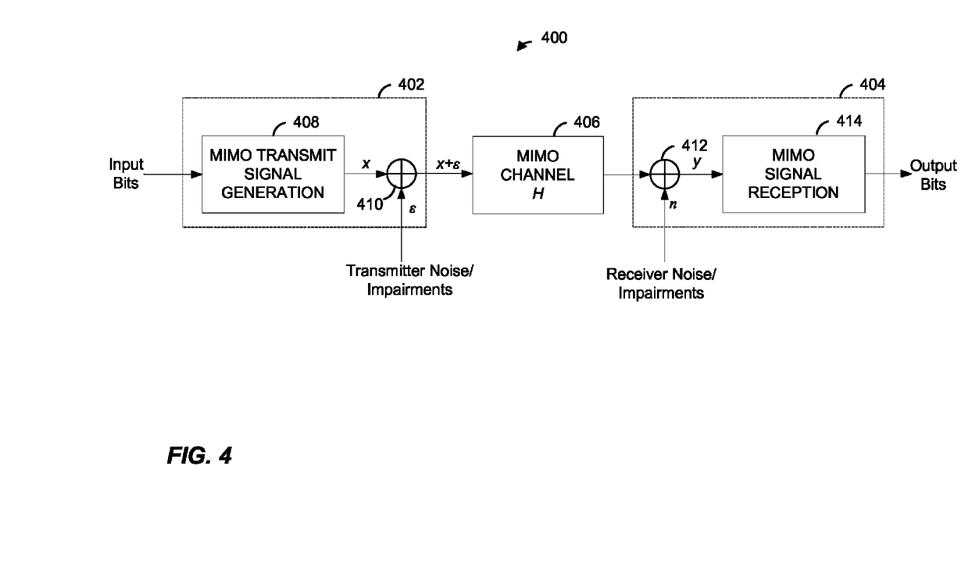
FIG. 4 is a block diagram of an example system model, according to an embodiment.

FIG. 4 is a block diagram of an example system model 400, according to an embodiment. In various embodiments, the system model 400 is utilized to derive a scheme for determining a noise whitening matrix at a receiving device (e.g., a client station 25). The model 400 is illustrated in FIG. 4 as having a transmitting communication device 402 (e.g., the AP 14 of FIG. 1) that transmits information to a receiving communication device 404 (e.g., the client station 25-1, the client station 25-4 of FIG. 1) via a MIMO communication channel 406. In the model 400, $N_t$ represents the number of transmit antennas at the transmitting device 402, $N_r$ represents the number of receive antennas at the receiving device 404, and $N_{ss}$ represents the number of spatial streams used for transmission from the transmitting device 402 to the receiving device 404 via the MIMO channel 406. As used herein, terms "receiving device" and "receiver" are used interchangeably. Similarly, as used herein, terms "transmitting device" and "transmitter" are used interchangeably.

The transmitting device 402 is illustrated as having a MIMO transmit signal generator 408 and a transmitter noise and impairments component 410. The MIMO transmit signal generator 408 receives input bits and, based on the input bits, generates a signal x to be transmitted to the receiving device 404. In various embodiments, the transmit signal generator 408 performs one or more of bit scrambling, encoding, stream parsing (e.g., to separate bits into multiple spatial streams), bit interleaving (i.e., changing the order of the bits to prevent long sequences of adjacent noisy bits from entering a decoder at the receiving device), constellation mapping, spatial stream mapping, inverse digital Fourier transformation, etc. to generate the signal to be transmitted x. The transmitter noise and impairments component 410 generally models noise and transmit chain impairments, such as phase noise, flicker noise, power amplifier non-linearities, in-phase/quadrature-phase (I/Q) mismatches, and carrier frequency offsets, etc. to which the signal x is subject at the transmitting device 402. In particular, in the model 400, the transmitter noise and other impairments are represented by a random variable noise vector ϵ, and the transmitted signal is, accordingly, represented by a sum of the signal x and the variable ϵ (i.e., x+ϵ). In an embodiment, the noise vector ϵ is assumed to be a zero-mean, independent and white random variable vector. According to an embodiment, the transmitted signal x+ϵ travels through a MIMO communication channel 406 to reach the receiving device 404. The signal x and the noise ϵ are generally transformed by the MIMO channel, which, in at least some situations, introduces correlation ("colors") the noise, in at least some embodiments and/or scenarios.

The receiving device 404 is illustrated in FIG. 4 as having a receiver noise component 412 and a MIMO signal receiver 414. The receiver noise component 412 generally models receiver noise and receive chain impairments to which a signal is subjected at the receiving device 404. In particular, in the model 400, the receiver noise and other impairments are represented by a random variable vector n. In an embodiment, the noise vector n is assumed to be a zero-mean, independent and white random variable vector. The MIMO signal receiver 414 generally demodulates and decodes the received signal y to reproduce, or at least estimate, the transmitted signal x. In various embodiments, the MIMO signal receiver 414 performs one or more of demodulation, de-interleaving, decoding, etc. of the signal received by the receiving device 404. In an embodiment, the MIMO signal receiver 414 includes a MIMO equalizer (e.g., a ZF equalizer, an ML equalizer, or another suitable MIMO equalizer) that generally equalizes received signal to allow for more accurate demodulation of the received signal. Further, to improve equalization of the signal, the MIMO signal receiver 414 applies noise whitening to the received signal prior to equalization of the received signal. According to an embodiment, noise whitening of the received signal transforms the noise in the received signal to de-color, or de-correlate, the noise such that the noise appears at least substantially white to the MIMO equalizer.

In accordance with the model 400, a signal y at the input to the MIMO receiver 414 is represented by $$y = H(x+\epsilon) + n \qquad \text{Equation 1}$$

where y is an $N_r \times 1$ signal vector received at the signal reception component 414, H is an $N_r \times N_{ss}$ channel matrix characterizing the channel 406, x is an $N_{ss} \times 1$ signal vector generated by the transmit signal generator 408, ϵ is an $N_{ss} \times 1$ noise vector at the transmitting device 402, and n is an $N_r \times 1$ noise vector at the receiving device 404. In an OFDM system, the expression in Equation 1 corresponds to a single sub-carrier of an OFDM signal, in an embodiment. In this embodiment, a respective expression, such as the Equation 1, can be written for each one of multiple sub-carriers in the received signal y, with the channel matrix H being a channel matrix characterizing the channel 406 at the corresponding sub-carrier frequency, the signal x being the signal transmitted at the corresponding subcarrier frequency, and the noise components ϵ and n representing, respectively, the corresponding sub-carrier frequency transmitter and the receiver noise components.

Based on the model 400, the received signal y of Equation 1 can be expressed as $$y = Hx + v \qquad \text{Equation 2}$$

where v a noise vector representing the total noise in the received signal y given by $$v = H\epsilon + n \qquad \text{Equation 3}$$

As can be seen from Equations 2 and 3, in the model 400, the transmitter noise and other impairments to which the signal x is subjected at the transmitter 402 and the receiver noise and other impairments to which the signal x is subjected at the receiver 404 are modeled as separate noise components of the total noise vector v in the received signal y. Further, model 400 captures that the transmitter noise and impairments are subject to transformation by the channel response H of the channel 406. In at least some embodiments and/or scenarios, the channel 406 causes coloring of the transmitter noise so that the transmitter noise in the received signal y is no longer white, in at least some embodiments and/or scenarios. In other words, in such embodiments and/or scenarios, the covariance matrix of the elements of the transmitter noise vector ϵ is a non-identity matrix and, in some cases, includes off-diagonal elements. Such non-white noise negatively effects equalization of the received signal in the MIMO receiver 414. In some embodiments, to improve equalization performance, noise whitening is applied to the received signal y to at least substantially whiten noise in the signal y prior to performing equalization of the signal.

Figure 5:
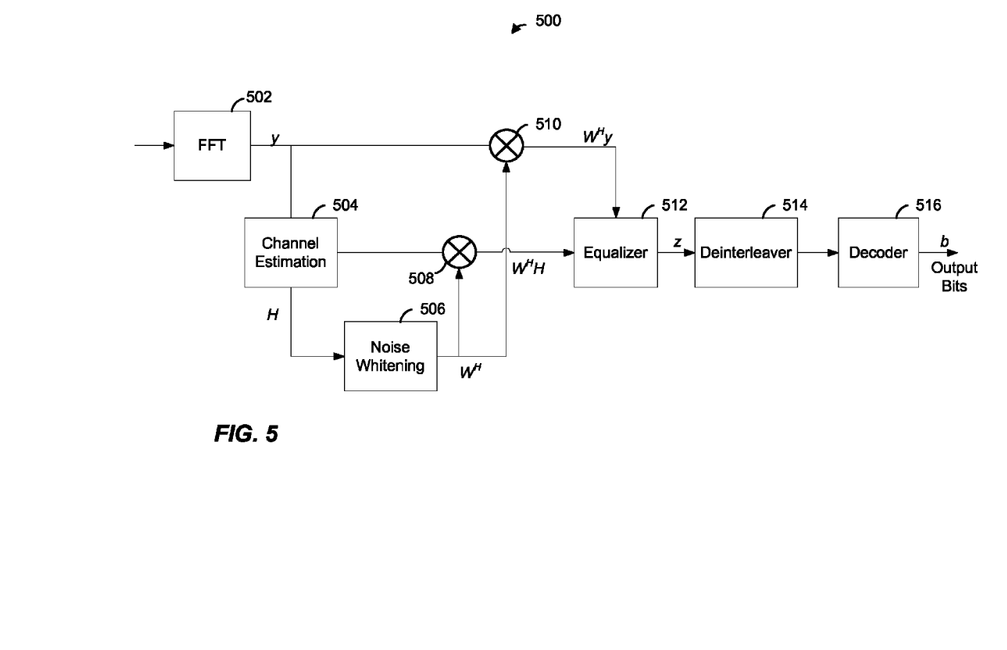
FIG. 5 is a block diagram of an example receiver processing unit, according to an embodiment.

FIG. 5 is a block diagram of an example receiver processing unit 500 suitable for use in the receiving device 404 of FIG. 4, according to an embodiment. Referring to FIG. 1, the PHY processing unit 20 and/or the PHY processing unit 29 each includes the receiver processing unit 500, in some embodiments. In other embodiments, PHY processing unit 20 and/or the PHY processing unit 29 includes a noise whitening capable receiver processing unit other than the receiver processing unit 500. Similarly, the receiver processing unit 500 is included in devices other than the AP 14 and/or client stations 25 of FIG. 1 and/or in device operating in networks other than the WLAN 10 of FIG. 1, in some embodiments.

The receiver processing unit 500 includes an FFT unit 502 coupled to a receive antenna (not shown) and operating on signals received via the receive antenna. Although only one FFT unit 502 is illustrated in FIG. 5, the receiver processing unit 500 includes multiple FFT units 502, where each FFT unit 502 is provided for each one of multiple receive antennas coupled to the receiver processing unit 500, in some embodiments. Alternatively, two or more of multiple receive antennas coupled to the receiver processing unit 500 are coupled to a single FFT unit 502, in some embodiments.

The output of the FFT unit 502 is provided to a channel estimation unit 504. Generally speaking, the channel estimation unit 504 determines or estimates a channel matrix H based on training data received from a transmitting device. The channel matrix estimation H is generated from sounding data transmitted from the transmitting device, in an embodiment. For example, in an embodiment, the transmitting device utilizes training fields, such as high throughput long training fields (e.g., the HT-LTFs 212 of FIG. 2) or very high throughout training fields (e.g., the VHT-LTFs 312 of FIG. 3) which are periodically generated and transmitted from the transmitting device to the receiving device. Each long training field includes a plurality of training symbols, which are used by the channel estimation unit 504 to determine or estimate the channel matrix H. Generally, the channel matrix estimation is generated at the beginning of a data transmission, such as the beginning of the transmission of a data packet, and reset for subsequent transmissions (e.g., reset for each subsequent data packet). Although HT-LTF generally relates to the IEEE Standard 802.11n standard, and VHT-LTF generally relates to the IEEE Standard 802.11 ac standard, it should be understood that other channel estimation preambles or channel estimation training patterns are utilized by the channel estimation unit 504 to compute or estimate the channel matrix H, in other embodiments.

The receiver processing unit 500 also includes a noise whitening unit 506 that receives channel estimates from the channels estimation unit 504 and, based on the channel estimates, generates a noise whiting matrix W, as will be described in more detail below. The noise whitening matrix W (or a Hermitian transpose of the whitening matrix W) is multiplied, at a junction 508, with a channel matrix H generated by the channel estimation unit 504, in an embodiment. Further, the noise whitening matrix W (or a Hermitian transpose of the whitening matrix W) is multiplied, at a junction 510, with data symbols in the received signal y. The effective channel matrix $H_{eff}$ and the whitened received signal y are provided to a MIMO equalizer 512, which processes the whitened received signal y to determine an estimate z of the transmitted signal x corresponding to the received signal y.

More particularly, in an embodiment, the MIMO equalizer 512 receives the effective channel matrix $W^H H$ and the whitened received signal $W^H y$, determines an equalization matrix based on the effective channel matrix $W^H H$, applies the equalization matrix to the whitened received signal $W^H y$, and generates a demodulated signal z based on the equalized whitened received signal $W^H y$. The MIMO equalizer 512 is a zero forcing equalizer, for example, in an embodiment. In another embodiment, the MIMO equalizer 512 is a maximum likelihood equalizer. In another embodiment, the MIMO equalizer 512 implements another suitable equalization scheme. The demodulated signal z is operated on by a deinterleaver 514 that rearranges scattered bits and restores proper bit sequences in the estimated signal z. Then, a decoder 516 decodes the demodulated signal z into a bit stream corresponding to information bits transmitted by the transmitting device.

In an embodiment, the noise whitening unit 506 implements a relatively simple and efficient scheme, derived based on the model 400 of FIG. 4, for determining a whitening matrix W. Derivation of a noise whitening scheme implemented by the noise whitening unit 506 in some embodiments will now be discussed in connection with the model 400 of FIG. 4. A covariance matrix $C_v$ of the noise vector v in Equation 2 is given by $$C_v = E\{vv^H\} \quad \text{Equation 4}$$

where E{ } denotes the expected value, and the superscript H denotes a Hermitian transpose. Substituting the expression for the noise vector v given in Equation 3 into Equation 4 results in $$C_v = E\{(H\epsilon+n)(H\epsilon+n)^H\} = HE\{\epsilon\epsilon^H\}H^H + E\{nn^H\} \quad \text{Equation 5}$$

$C_v$ in Equation 5 can further be expressed as $$C_v = H(\rho_\epsilon^2 I_{N_{SS}})H^H + \rho_n^2 I_{N_R} \quad \text{Equation 6}$$

where $\rho_\epsilon$ represents variance of transmitter noise $\epsilon$ and $\rho_n$ represents variance of receiver noise n. In an embodiment, a noise scaling factor s is determined as a ratio of variance of noise and other impairments to which the signal is subject at the receiver (receiver noise) to the variance of noise and other impairments to which the signal is subject at the transmitter (transmitter noise), given by $$s = \frac{\rho_n}{\rho_\epsilon} \quad \text{Equation 7}$$

In terms of the noise scaling factor s, Equation 6 can be rewritten as $$C_v = \rho_\epsilon^2 HH^H + \rho_n^2 I_{N_R} = \rho_\epsilon^2(HH^H + s^2 I_{N_R}) \quad \text{Equation 8}$$

Further, ignoring the factor $\rho_\epsilon^2$ in Equation 8, the covariance matrix $C_v$ can be expressed as $$C_v = HH^H + s^2 I_{N_R} \quad \text{Equation 9}$$

Generally speaking, whitening of noise in a signal y is achieved by applying a Hermitian transpose of the whitening matrix W to the signal y, in an embodiment. Based on Equation 2 above, the noise whitening operation can be written as $$W^H y = W^H Hx + W^H v \quad \text{Equation 10}$$

Let $u = W^H v$, then a covariance matrix of u can be written as $$C_u = E\{uu^H\} = E\{W^H vv^H W\} = W^H E\{vv^H\}W \quad \text{Equation 11}$$

$C_u$ in Equation 11 can be written in terms of the covariance matrix $C_v$ of the noise vector v as $$C_u = W^H C_v W \quad \text{Equation 12}$$

Based on Equation 12, in an embodiment, a whitening matrix W is determined such that the covariance matrix $C_u$ is transformed into an identity matrix $$W^H C_v W = I \quad \text{Equation 13}$$

Accordingly, the whitening matrix W is determined such that the expression in Equation 14 below is satisfied $$WW^H = C_v^{-1} \quad \text{Equation 14}$$

To satisfy Equation 14, a whitening matrix W can be computed as a square root of the inverse of the noise covariance matrix $C_v$. However, matrix inversion and square root operation are generally expensive operations in terms of hardware needed to perform such operations and power consumed by the hardware while performing the operations. In an embodiment, using the model 400, a simplified algorithm for determining the whitening matrix W is derived, as described below.

Based on the system model 400, the expression for the covariance matrix $C_v$ given above in Equation 6 can be rewritten as $$C_v = HH^H + s^2 I_{N_R} = \begin{bmatrix} H^H \\ sI \end{bmatrix}^H \begin{bmatrix} H^H \\ sI \end{bmatrix} = B^H B \quad \text{Equation 15}$$

where B is a matrix of dimensionality $(N_{ss}+N_r) \times N_r$ given by $$B = \begin{bmatrix} H^H \\ sI \end{bmatrix} \quad \text{Equation 16}$$

The matrix B can be decomposed into a matrix Q and a matrix R where the matrix Q is a square orthogonal matrix of dimensionality $(N_{ss}+N_r) \times (N_{ss}+N_r)$ and R is an upper triangular matrix of dimensionality $(N_{ss}+N_r) \times N_r$. The matrix B can then be expressed as $$B = Q_B R_B \quad \text{Equation 17}$$

where $Q_B$ is a matrix obtained by dropping the last $N_{ss}$ column of the matrix Q and $R_B$ is a matrix obtained by dropping the last $N_{ss}$ rows of the matrix R. Accordingly, the matrix $Q_B$ in Equation 17 is of dimensionality $(N_{ss}+N_r) \times N_r$ and the matrix $R_B$ in Equation 17 is a square matrix of dimensionality $N_r \times N_r$.

The covariance matrix $C_v$ according to Equation 15 can then be written in terms of $Q_B$ and $Q_B$ as $$C_v = (Q_B R_B)^H Q_B R_B = R_B^H Q_B^H Q_B R_B \quad \text{Equation 18}$$

Further, because $Q_B^H Q_B = I$, $C_v$ in Equation 18 can be written as $$C_v = R_B^H R_B \quad \text{Equation 19}$$

Based on Equation 19, the inverse of the covariance matrix $C_v$ is given by $$C_v^{-1} = R_B^{-1} (R_B^{-1})^H \quad \text{Equation 20}$$

From Equations 14 and 20, it follows that the whitening matrix W can be determined according to $$W = R_B^{-1} \quad \text{Equation 21}$$

Further, equating Equations 16 and 17, $$B = \begin{bmatrix} H^H \\ sI \end{bmatrix} = Q_B R_B \quad \text{Equation 22}$$

$Q_B$ can be written as a tall matrix $$\begin{bmatrix} Q_{B1} \\ Q_{B2} \end{bmatrix}$$

where $Q_{B1}$ is a matrix of dimensionality $(N_{ss}+N_r) \times N_r$ and $Q_{B2}$ is a square matrix having of dimensionality $N_r \times N_r$. Equation 22 can be written in terms of $Q_{B1}$ and $Q_{B2}$ as $$B = \begin{bmatrix} Q_{B1} \\ Q_{B2} \end{bmatrix} R_B \quad \text{Equation 23}$$

From Equations 22 and 23 it follows that $$Q_{B1} R_B = H^H \quad \text{Equation 24}$$

and $$Q_{B2} R_B = sI \quad \text{Equation 25}$$

Further, from Equations 21 and 25, it follows that $$W = \frac{Q_{B2}}{s} \quad \text{Equation 26}$$

Accordingly, in an embodiment, the whitening matrix W is determined by performing QR decomposition of the matrix B, which is generally less computationally complex and considerably less expensive than matrix inversion. For example, in OFDM systems in which a respective whitening matrix is determined for each of a plurality of tones (sub-carriers) of the signal y, QR decomposition operations result in considerable savings of computational complexity, circuit area, consumed power, etc. relative to matrix inversion operations.

In an embodiment, in a MIMO system, the channel estimation unit 504 estimates the channel based on training data (e.g., training symbols transmitted in a training field of a data unit) transmitted by the transmitting device to allow the receiving device to determine a channel estimate for every spatial stream utilized for transmissions to the receiving device. For example, a data unit that conform to the IEEE 802.11n Standard and the IEEE 802.11 ac Standard include a sufficient number of long training field (HT-LTFs and VHT-LTFs, respectively) to allow a receiving device fully obtain an estimate of a multi-stream communication channel between the transmitting device and the receiving device. Referring to FIGS. 2 and 3, according to the IEEE 802.11n Standard and the IEEE 802.11 ac Standard, symbols of each long training field (HT-LTFs 212, VHT-LTFs 312) is multiplied by a corresponding column of a preamble steering matrix P. In an embodiment, a number of rows of the matrix P corresponds with the number of spatial streams $N_{SS}$, and a number of columns of the matrix P corresponds with a number of LTFs (e.g., the number of spatial streams $N_{ss}$ over which the data unit is transmitted). Matrix P improves the orthogonality of the training symbols in the long training fields 212, 312 as they are transmitted from the different transmit antennas, in an embodiment. In an embodiment, the matrix P is an orthogonal matrix. Accordingly, the product of P and $P^H$ is an identity matrix, in this embodiment. Applying the matrix P to the covariance matrix given in Equation 9 gives $$C_v = (HP)(HP)^H + s^2 I_{N_R} = (HPP^H H^H) + s^2 I_{N_R} \quad \text{Equation 27}$$

Because $PP^H = I$, the matrix P effectively drops out from the Equation 27. Consequently, a receiver need not receive all training field prior to beginning the whitening matrix computations based on the training fields as discussed above. In an embodiment, the noise whitening matrix computation unit begins the whitening matrix computation after receiving channel estimates corresponding to the LTF (e.g., the first HT-LTF 212-1, the first VHT-LTF 312-1) and updates the computation for each of the remaining LTF as channel estimates calculated based on each of the remaining LTF is received. In other words, whitening matrix computation for the multiple spatial streams is staggered with respect to the spatial streams, which generally reduces computational burden in the receiving device. The final whitening matrix W is available after the last LTF field of the data unit is received, and the whitening matrix is updated based on the last LTF field, in this embodiment.

For example, in an embodiment, the receiver processing unit 500 receives a first long training field (e.g., the HT-LTFs 212-1, the VHT-LTFs 312-2) and the channel estimation unit 504 generate a channel estimation based on the received first long training field. In other words, the channel estimation unit 504 generates a vector h1 containing elements of the channel matrix H corresponding to a first spatial stream. The channel estimation generated based on the first training field is provided to the noise whiting unit 506. Upon receiving the channel estimation generated based on the first training field, the noise whitening unit begins computation of the whitening matrix W. For example, the noise whitening unit constructs a matrix B, as discussed above, using the channel estimation generated based on the first training field, and performs QR decomposition of the constructed matrix B. Thus, QR decomposition of the matrix B begins before the second training field is received by the receiver processing unit 500 and/or before a channel estimation based on the second training field is completed by the channel estimation unit 504, in at least some embodiments and/or scenarios.

Then, when a second signal field is received, and channel estimation based on the second signal field is completed by the channel estimation unit 504, the noise whitening unit 506 receives the channel estimate generated based on the second training field, and constructs a matrix B using the second channel estimate and the result of QR decomposition performed using the channel estimate generated based on the first training field, and so on. Upon receiving the last training field, the noise whitening unit completes generation of the whitening matrix W, in an embodiment. Alternatively, in another embodiment, a complete channel matrix H is obtained by the channel estimation unit 504 and is then provided to the noise whitening unit 506, and the noise whitening unit 506 operates on the full channel matrix H.

In any event, according to an embodiment, when the channel estimation unit receives all of the LTF fields (e.g., HT-LTFs 212, VHT-LTFs 312) in a data unit and calculates or determines the channel estimate H based on the training fields in the data unit, the channel estimate H is multiplied by the whitening matrix W at a junction 508 to generate an effective channel matrix $H_{eff}=W^H H$. In some embodiments in which OFDM modulation is utilized, the channel estimation unit 504 generates a respective channel matrix H for each of a plurality of tones, or sub-carriers, of the received signal y (e.g., all tones, all data tones, a subset of data tones, etc.). Similarly, in such embodiments, the noise whitening unit 506 generates a respective whitening matrix W for each of a plurality of tones, or sub-carriers, of the received signal y (e.g., all tones, all data tones, a subset of data tones, etc.). In such embodiments, each respective channel matrix H is then multiplied by the whitening matrix W generated for the corresponding tone, or for the corresponding set of tones, at the junction 508. Further, data symbols in the received signal y are multiplied by the whitening matrix W at a junction 510 to generate whitened data symbols $W^H y$. In some embodiments utilizing OFDM transmission, each of a plurality of tones (or sub-carriers), or each group of a plurality of groups of tones, in the data symbols are multiplied by a respective whitening matrix W generated by the noise whitening unit 506 for the corresponding tones.

Figure 6:
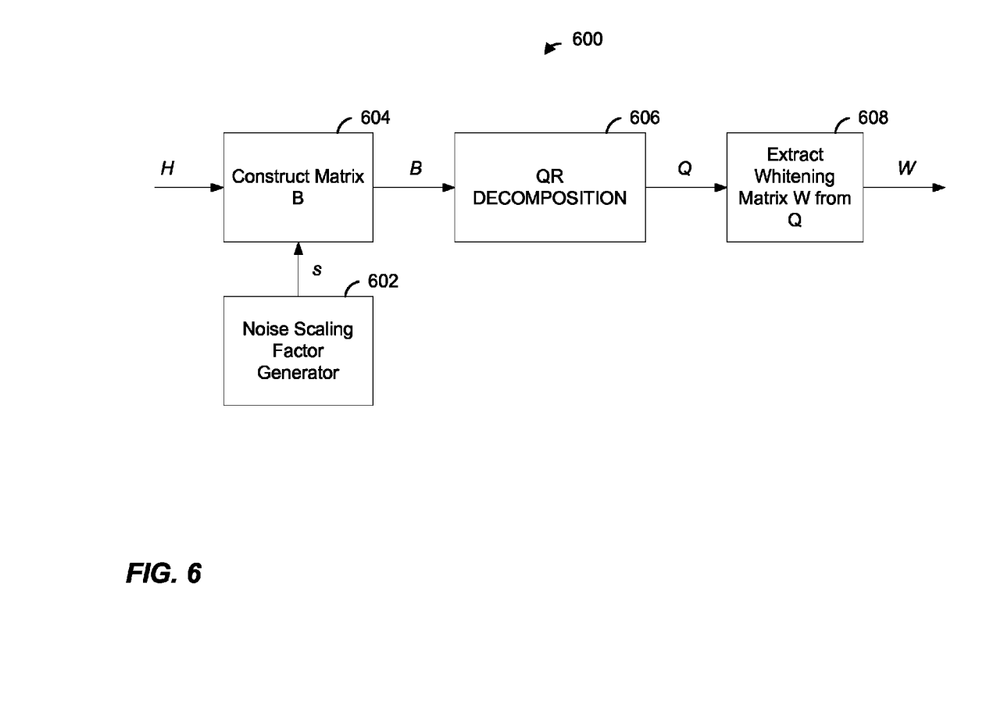
FIG. 6 is a flow chart illustrating a technique for determining a whitening matrix W based on a channel estimate H, according to an embodiment.

FIG. 6 is a flow chart illustrating a technique 600 for determining a whitening matrix W based on a channel estimate H, according to an embodiment. In an embodiment, the noise whitening unit 506 of FIG. 5 implements the whitening technique 500. A noise scaling factor s is generated at block 602. The noise scaling factor s is determined as a ratio of variance of receiver noise to variance of transmitter noise, in an embodiment. In this embodiment, the noise scaling factor s is a relative measure of noise introduced into a signal by a receiver and noise introduced into the signal by the transmitter. Several example techniques used for generating the noise scaling factor s at block 602 are described in more detail below.

At block 604, a matrix B is constructed based on the channel estimate H and using the scale factor s generated at block 602. In an embodiment, the matrix B is constructed at block 604 according to Equation 16. At block 606, QR decomposition of the matrix B is performed. In other words, the matrix B is decomposed at block 606 into a unitary matrix $Q_B$ and an upper triangular matrix $R_B$. For example, QR decomposition at block 606 is implemented via a plurality of coordinate rotation digital calculation (CORDIC) engines that perform QR calculations, in an embodiment. In other embodiments, QR decomposition at block 606 is implemented in other suitable manners.

At block 608, a whitening matrix W is determined. In an embodiment, the whitening matrix W is obtained at block 608 by extracting a matrix $Q_{B2}$ from the unitary matrix Q generated at block 606, and scaling the extracted matrix $Q_{B2}$ by the noise scaling factor s generated at block 602. In an embodiment, the matrix $Q_{B2}$ is a matrix of dimensionality $N_r \times N_r$ corresponding to $N_r$ bottom rows of the matrix $Q_B$. To extract the matrix $Q_{B2}$ from the matrix $Q_B$, in one embodiment, the matrix $Q_B$ separated (at block 608) into a matrix $Q_{B1}$ and a matrix $Q_{B2}$ such that $$Q_B = \begin{bmatrix} Q_{B1} \\ Q_{B2} \end{bmatrix},$$

wherein the matrix $Q_{B1}$ is a matrix of dimensionality $N_{ss} \times N_r$, and the matrix $Q_{B2}$ is a matrix of dimensionality $N_r \times N_r$. Then, to obtain the whitening matrix W, the matrix $Q_{B2}$ scaled by the noise scaling factor s generated at block 602, such that $$W = \frac{Q_{B2}}{s},$$

in an embodiment.

The noise scaling factor s at the noise scaling factor generator block 602 is determined statically, or is adjusted dynamically, depending on the embodiment. In one embodiment, one or more scaling factors are generated and are stored in a memory, such as a register. For example, a noise scaling factor s is stored in a memory and is retrieved from memory at block 602, in an embodiment. In another embodiment, multiple of scaling factors s are generated and stored in memory, with each scaling factor s corresponding to a particular scenario (e.g., associated with one or more of signal to noise ratio (SNR), modulation and coding scheme (MCS), signal bandwidth, etc.). In this embodiment, a particular scaling factor s is selected at block 602 based on, for example, one or more of a SNR measured or determined for the signal for which the whitening matrix W is being developed, MCS that was used to generate the transmitted signal, the signal bandwidth of the signal, etc.

In another embodiment, the noise scaling factor s is generated at block 602 dynamically based on the signal being processed. In various embodiments, dynamic generation of the scaling factor s automatically adjusts to the particular scenario and/or situation, such as the SNR, the MCS, the signal bandwidth, and the like.

For example, in an embodiment, the scaling factor s is generated based on a signal field transmissions in the signal y, such as based on one or more of the L-SIG field 206 and the HT-SIG field 208 of the data unit 200 of FIG. 2, or one or more of L-SIG field 306 and the VHT-SIGA field 308 of the data unit 300 of FIG. 3, in some embodiments. In some embodiment, such fields are generated according to a lowest order modulation (e.g., BPSK) and using a lowest coding rate (e.g., ½). Due at least in part to low order modulation and low coding rate used for these fields, decoding these fields at the receiver is typically accurate and reliable. In an embodiment, decoded symbols are subtracted from received symbols to obtain an effective noise vector corresponding to noise present in the signal at the receiving device. Then, based on the effective noise vector, relative contributions to the noise vector from the transmitter and from the receiver are estimated, in an embodiment, as discussed in more detail below.

Returning to the system model 400 of FIG. 4, for a single stream case, the channel matrix H of the channel 406 can be represented by a vector h, and, based on Equation 5, the covariance matrix of the total noise v can be written as $$C_v = E\{(h\epsilon+n)(h\epsilon+n)^H\} = hE\{\epsilon\epsilon^H\}h^H + E\{nn^H\}$$ Equation 28

Equation 28 can be rewritten as $$C_v = h(\rho_\epsilon^2 I_{N_{SS}})h^H + \rho_n^2 I_{N_R}$$ Equation 29 where $\rho_\epsilon$ represents variance of transmitter noise and $\rho_n$ represents variance of receiver noise, and Equation 29 can further be expressed as $$C_v = \rho_\epsilon^2 hh^H + \rho_n^2 I_{N_R}$$ Equation 30

Referring to FIG. 5, in an embodiment, the noise scaling factor s is determined based on observed, or estimated, values z at the output of the MIMO equalizer 512 during the reception of the one or more single stream fields, such as one or more of the signal fields discussed above (e.g., L-SIG, HT-SIG, VHT-SIG). Let $\tilde{\rho}_\epsilon^2$ and $\tilde{\rho}_n^2$ represent the maximum likelihood estimation (MLE) values of $\rho_\epsilon$ and $\rho_n$, respectively. According to an embodiment, the maximum likelihood estimates of the values of $\tilde{\rho}_\epsilon^2$ and $\tilde{\rho}_n^2$ are determined based on the channel estimate h, the received signal y samples generated by the FFT unit 502, and the output z of the equalizer 512 according to $$\tilde{\rho}_n^2 = \frac{\|h\|^2 \|y - hz\|^2 - \|h^H(y - hz)\|^2}{\|h\|^2(N_r - 1)}$$ Equation 31 and $$\tilde{\rho}_\epsilon^2 = \frac{1}{\|h\|^2}\left[\frac{\|h^H(y - hz)\|^2}{\|h\|^2} - \tilde{\rho}_n^2\right]$$ Equation 32 respectively.

Accordingly, a noise scaling factor $s^2$ can be determined by taking the square root of $$s^2 = \frac{\tilde{\rho}_n^2}{\tilde{\rho}_\epsilon^2} = \|h\|^2 \left[\frac{1 - \frac{\|h^H(y-hz)\|^2}{\|h\|^2\|y-hz\|^2}}{N_r \frac{\|h^H(y-hz)\|^2}{\|h\|^2\|y-hz\|^2} - 1}\right]$$ Equation 33

In some embodiments, $\tilde{\rho}_\epsilon^2$ and $\tilde{\rho}_n^2$ values are generated for each one of a plurality of tones (or sub-carriers) within the single stream signals being utilized, and are then averaged over the plurality of tones. Averaging estimates over a plurality of tones improves accuracy of $\tilde{\rho}_\epsilon^2$ and $\tilde{\rho}_n^2$ estimation, in at least some such embodiments.

Figure 7:
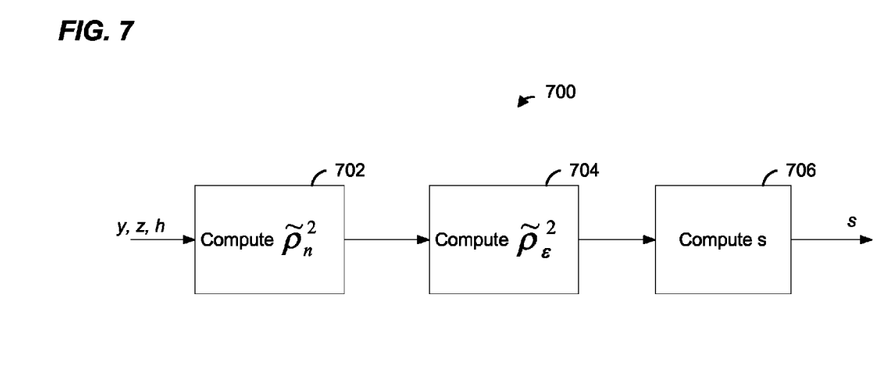
FIG. 7 is a flow chart illustrating a technique for dynamically generating a noise scaling factor s, according to an embodiment.

FIG. 7 is a flow chart illustrating a technique 700 for dynamically generating a noise scaling factor s based on a received signal, y, demodulated representation of the received signal, z, and a channel estimate h, according to an embodiment. In an embodiment, the noise scaling factor s at block 602 in FIG. 6 is generated using the technique 700. In another embodiment, the noise scaling factor s at block 602 in FIG. 6 is generated using another suitable scheme.

At block 702, variance of receiver noise, $\tilde{\rho}_n^2$, is computed. In an embodiment, variance of receiver noise $\rho_n^2$ is computed at block 702 according to Equation 31. In an embodiment, a respective value for variance of receiver noise $\tilde{\rho}_n^2$ is computed for each one of a plurality of tones, or sub-carriers, of an OFDM symbol, and an average of the respective values for $\tilde{\rho}_n^2$ over the plurality of tones is computed. At block 704, variance of transmitter noise, $\tilde{\rho}_\epsilon^2$, is computed. In an embodiment, variance of transmitter noise is computed at block 704 according to Equation 32. In an embodiment, a respective value for variance of transmitter noise $\tilde{\rho}_\epsilon^2$ is computed for each one of a plurality of tones, or sub-carriers, of an OFDM symbol, and an average of the respective values for $\tilde{\rho}_\epsilon^2$ over the plurality of tones is computed. Then, at block 706, the noise scaling factor s is determined as a square root of the ratio of $\tilde{\rho}_n^2$ determined at block 702 to $\tilde{\rho}_\epsilon^2$ determined at block 704.

Figure 8:
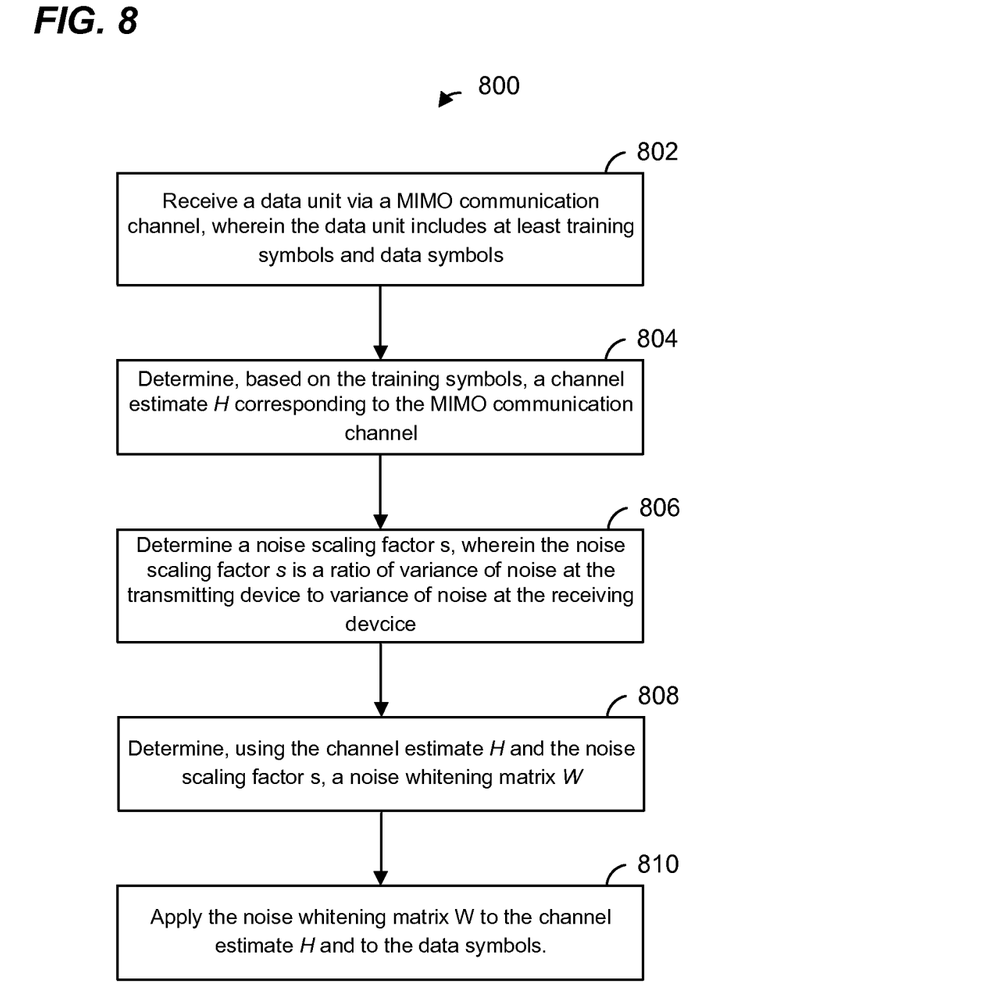
FIG. 8 is a flow diagram of an example method for whitening noise in a signal received by a receiving device from a transmitting device via a multi input multi output (MIMO) communication channel, according to an embodiment.

FIG. 8 is a flow diagram of an example method 800 for whitening noise in a signal received by a receiving device from a transmitting device via a multi input multi output (MIMO) communication channel, according to an embodiment. As an example, the PHY processing unit 20, 29 (FIG. 1) is configured to implement the method 800 at least partially, in one embodiment. In an embodiment, the receiving device 404 is configured to implement the method 800. In an embodiment, the receiver processing unit 500 of FIG. 5 is configured to implement the method 800. In other embodiments, the method 800 is implemented by other suitable communication devices.

At block 802, a data unit is received at the receiving device from the transmitting device via the MIMO communication channel. In an embodiment, the data unit 200 of FIG. 2 is received. In another embodiment, the data unit 300 of FIG. 3 is received. In other embodiments, other suitable data units are received. The received data unit includes at least training symbols (e.g., one or more LTFs) and one or more data symbols.

At block 804, a channel estimate corresponding to the MIMO communication channel is determined. The channel estimate is determined at block 804 based on the one or more training fields, in an embodiment. At block 806, a noise scaling factor s is determined. In an embodiment, the noise scaling factor s is determined statically or is pre-determined. For example, the noise scaling factor s is selected from a plurality of scaling factors stored in a memory (e.g., based on one or more of SNR, MCS, signal bandwidth, etc.). In another embodiment, the noise scaling factor s is determined dynamically, based on the data unit. For example, the noise scaling factor s is determined according to the technique 700 of FIG. 7, in an embodiment. In other embodiments, other suitable schemes for determining the scaling factor s at block 806 are utilized.

At block 808, a whitening matrix W is determined using the channel estimate H determined at block 804 and the noise scaling factor s determined at block 806. The noise whitening matrix W is determined according to the technique 600 of FIG. 6, for example, in an embodiment. At block 810, the noise whitening matrix W is applied to the data symbols in the received data unit to generate whitened data symbols, and, in at least some embodiments, to the channel estimate matrix H determined at block 804 to generate an effective channel estimate $H_{\textit{eff}}$. In an embodiment, the whitened data symbols and the effective channel estimate $H_{\textit{eff}}$ are operated on by a MIMO equalizer, such as an ML equalizer, a ZF equalizer, or another suitable equalizer. Whitening noise in the data generally improves performance of the MIMO equalizer, in at least some embodiments.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of whitening noise in a signal received by a receiving device from a transmitting device via a multi input multi output (MIMO) communication channel, the method comprising:
   receiving, at the receiving device, data from a data unit via the MIMO communication channel, wherein the data includes at least training symbols and data symbols;
   determining, with the receiving device and based on the training symbols, a channel estimate H corresponding to the MIMO communication channel;
   determining a noise scaling factor s, wherein the noise scaling factor s is a ratio of variance of noise at the receiving device to a variance of noise at the transmitting device;
   determining, using the channel estimate H and the noise scaling factor s, a noise whitening matrix W; and
   applying the noise whitening matrix W to (i) the channel estimate H to generate an effective channel matrix $H_{\textit{eff}}$ and (ii) to the data symbols to generate whitened data symbols.

2. The method of claim 1, wherein determining the noise whitening matrix W comprises:
   constructing a matrix B, wherein
   $$B = \begin{bmatrix} H^H \\ sI \end{bmatrix},$$
   wherein $H^H$ is a Hermitian transpose of the channel estimate H, and I is an identity matrix of dimensionality $N_r \times N_r$, wherein $N_r$ corresponds to a number of receive antennas via which the data is received at the receiving device;
   performing QR decomposition of the matrix B to generate a unitary matrix $Q_B$ and an upper triangular matrix $R_B$; and
   extracting the whitening matrix W from the unitary matrix $Q_B$.

3. The method of claim 2, wherein extracting the whitening matrix W from the unitary matrix $Q_B$ further comprises:
   partitioning the matrix $Q_B$ into a matrix $Q_{B1}$ and a matrix $Q_{B2}$, wherein
   $$Q_B = \begin{bmatrix} Q_{B1} \\ Q_{B2} \end{bmatrix},$$
   wherein the matrix $Q_{B1}$ is a matrix of dimensionality $N_{ss} \times N_r$, and wherein the matrix $Q_{B2}$ is the matrix of dimensionality $N_r \times N_r$, wherein $N_{ss}$ corresponds to a number of spatial streams over which the data is received by the receiving device; and
   obtaining the whitening matrix W by scaling the matrix $Q_{B2}$ by the noise scaling factor s.

4. The method of claim 1, further comprising, after applying the noise whitening matrix W to the channel estimate H and to the data symbols, equalizing the data symbols using a MIMO equalizer.

5. The method of claim 4, wherein the MIMO equalizer is a zero forcing equalizer.

6. The method of claim 4, wherein the MIMO equalizer is a maximum likelihood (ML) equalizer.

7. The method of claim 4, wherein equalizing the data symbols comprises equalizing the data symbols based on the effective channel estimate $H_{\textit{eff}}$.

8. The method of claim 1, wherein the training symbols comprise a plurality of training signal fields corresponding to a plurality of spatial streams over which the data is received, including at least a first training field corresponding to a first spatial stream and a second training field corresponding to a second spatial stream, wherein determining the whitening matrix W includes beginning computation of the whitening matrix W prior to receiving the second training field.

9. The method of claim 1, wherein determining the noise scaling factor s comprises selecting the noise scaling factor s from a plurality of stored noise scaling factors s.

10. The method of claim 1, wherein determining the noise scaling factor s comprises determining the noise scaling factor s dynamically based on one or more fields of the data unit.

11. The method of claim 10, wherein determining the noise scaling factor s dynamically comprises determining the noise scaling factor s based on at least i) a received symbol of the one or more fields, ii) a decoded symbol corresponding the received symbol and iii) the channel estimation H.

12. An apparatus, comprising:
a network interface configured to receive data from a data unit via a MIMO communication channel, wherein the data includes at least training symbols and data symbols, wherein the network interface includes:
a channel estimation unit configured to determine, based on the training symbols, a channel estimate H corresponding to the MIMO communication channel;
a noise scaling factor generator configured to determine a noise scaling factor s, wherein the noise scaling factor s is a ratio of variance of receiver noise to a variance of transmitter noise, and
a noise whitening unit configured to determine, using the channel estimate H and the noise scaling factor s, a noise whitening matrix W, and
wherein the network interface is further configured to apply the noise whitening matrix W to (i) the channel estimate H to generate an effective channel matrix $H_{eff}$ and (ii) the data symbols to generate whitened data symbols.

13. The apparatus of claim 12, wherein the noise whitening unit is configured to:
construct a matrix B, wherein $$B = \begin{bmatrix} H^H \\ sI \end{bmatrix},$$

wherein $H^H$ corresponds to a Hermitian transpose of the channel estimate H, and I is an identity matrix of dimensionality $N_r \times N_r$, wherein $N_r$ corresponds to a number of receive antennas via which the data is received;
perform QR decomposition of the matrix B to generate a unitary matrix $Q_B$ and an upper triangular matrix $R_B$; and
extract the whitening matrix W from the unitary matrix $Q_B$.

14. The apparatus of claim 13, wherein the noise whitening unit is further configured to:
partition the matrix $Q_B$ into a matrix $Q_{B1}$ and a matrix $Q_{B2}$, wherein $$Q_B = \begin{bmatrix} Q_{B1} \\ Q_{B2} \end{bmatrix},$$

wherein the matrix $Q_{B1}$ is a matrix of dimensionality $N_{SS} \times N_r$, and wherein the matrix $Q_{B2}$ is the matrix of dimensionality $N_r \times N_r$, wherein $N_{ss}$ corresponds to a number of spatial streams over which the data is received; and
obtain the whitening matrix W by scaling the matrix $Q_{B2}$ by the noise scaling factor s.

15. The apparatus of claim 12, wherein the network interface further includes a MIMO equalizer configured to equalize the whitened data symbols.

16. The apparatus of claim 15, wherein the MIMO equalizer is a zero forcing equalizer.

17. The apparatus of claim 15, wherein the MIMO equalizer is a maximum likelihood (ML) equalizer.

18. The apparatus of claim 15, wherein the MIMO equalizer equalizes the whitened data symbols based on the effective channel estimate $H_{eff}$.

19. The apparatus of claim 12, wherein the training symbols comprise a plurality of training signal fields corresponding to a plurality of spatial streams over which the data is received, including at least a first training field corresponding to a first spatial stream and a second training field corresponding to a second spatial stream, wherein the noise whitening unit is configured to begin computation of the whitening matrix W before the network interface second training field is received.

20. The apparatus of claim 12, wherein the noise scaling factor generator is configured to select the noise scaling factor s from a plurality of stored noise scaling factors s.

21. The apparatus of claim 12, wherein the noise scaling factor generator is configured to determine the noise scaling factor s dynamically based on the data unit.

22. The apparatus of claim 12, wherein the noise scaling factor generator is configured to determine the noise scaling factor s dynamically based on at least i) a received symbol of the data unit, ii) a decoded symbol corresponding the received symbol and iii) the channel estimation.

* * * * *